US006785269B2

(12) United States Patent
Laubner et al.

(10) Patent No.: US 6,785,269 B2
(45) Date of Patent: Aug. 31, 2004

(54) CONTROL INTERFACE UNIT FOR REALIZING A SIMULTANEOUS CONTROLLING OF AT LEAST TWO LOGICAL UNITS AND APPERTAINING METHOD

(75) Inventors: Karsten Laubner, Munich (DE); Marcel-Abraham Troost, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 803 days.

(21) Appl. No.: 09/736,710

(22) Filed: Dec. 13, 2000

(65) Prior Publication Data

US 2001/0004364 A1 Jun. 21, 2001

(30) Foreign Application Priority Data

Dec. 17, 1999 (DE) .......................................... 199 61 130

(51) Int. Cl.[7] .......................... H04L 12/28; H04L 12/50
(52) U.S. Cl. ........................ 370/369; 370/392; 370/475
(58) Field of Search ................................ 370/369, 389, 370/370, 386, 392, 393, 471, 475, 466, 419; 710/1, 36, 49; 709/227–229

(56) References Cited

U.S. PATENT DOCUMENTS

| 4,815,071 A | | 3/1989 | Shimizu |
| 5,184,348 A | * | 2/1993 | Abdelmouttalib et al. . 370/95.1 |
| 5,983,271 A | * | 11/1999 | Alexander et al. .......... 709/227 |

* cited by examiner

Primary Examiner—Duc Ho
(74) Attorney, Agent, or Firm—Morrison & Foerster LLP

(57) ABSTRACT

A control interface unit (1) for the realization of a simultaneous controlling of at least two logical units is provided, as well as an appertaining method, in which a control field evaluation unit (2) evaluates a transmitted control field (SF) and produces a control value (SF'). Depending on the control value (SF'), an address field conversion unit (3) converts a transmitted address field (AF) into a relevant address (ASIC-Adr), by which a data field selection unit (4) selects, dependent on the control value (SF'), a data field (DF1, DF2) that fits the address. In this way, one obtains, with the use of a common control interface, a simple and economical simultaneous controlling of at least two logical units.

15 Claims, 3 Drawing Sheets

FRAME

| ASIC Mode | A - Area/Range SF Bit 7 | AF Bit 5...0 | Processed Data Field | Address Decoding (Comparison) |
|---|---|---|---|---|
| A | X | Adr | Data Field 1 | A-Field=ASIC-Adr. |
| B | 0 | Adr | Data Field 1 | A-Field=ASIC-Adr. |
| B | 1 | Adr | Data Field 2 | A-Field & Mask=ASIC-Adr. |

CONTROL INTERFACE UNIT FOR REALIZING A SIMULTANEOUS CONTROLLING OF AT LEAST TWO LOGICAL UNITS AND APPERTAINING METHOD

BACKGROUND OF THE INVENTION

1. Field of the Invention

The present invention relates to a control interface unit for realizing a simultaneous controlling of at least two logical units, and to an appertaining method, and particularly to a control interface unit as implemented in coupling network modules for realizing a coupling network of a telecommunication switching installation.

2. Description of the Related Art

In a telecommunication switching installation, an actual coupling or switching of data or speech channels is carried out in a coupling network, which typically comprises a multiplicity of logical units for the spatial and/or chronological allocation of the data channels. The logical units or coupling network modules that realize such a conventional coupling network have up to now been controlled in a chronologically serial fashion using a control bus, or simultaneously via various control buses. However, the disadvantage of such a chronologically serial individual controlling of the logical units is that a separate control command must be generated at the associated control interface or at the control bus for each logical unit, which can result in a considerable delay in the controlling, particularly given a large number of logical units. On the other hand, the use of a plurality of control interfaces or control buses represents a large development and manufacturing outlay, which, particularly in very tightly packed switching modules, can be realized only with great difficulty due to space considerations or due to a lack of interference immunity.

SUMMARY OF THE INVENTION

The invention is therefore based on the object of creating a control interface unit for the realization of a simultaneous controlling of at least two logical units, as well as an appertaining method, which can be realized simply and economically.

This object is achieved by a control interface unit for simultaneously controlling at least two logical units, comprising a control field evaluation unit for evaluating a control field transmitted in a frame, dependent on a decoding value, and for producing a control value; an address field conversion unit for converting a transmitted address field dependent on the produced control value; and a data field selection unit for selecting a data field from a multiplicity of transmitted data fields dependent on the produced control value.

This object is also achieved by a method for simultaneously controlling at least two logical units, comprising the steps of evaluating a control field transmitted in a frame, if a decoding value so indicates, for the production of a control value; converting an address field transmitted in the frame, if the control value so indicates; and selecting a data field from a multiplicity of data fields transmitted in the frame, depending on the control value.

Due, in particular, to the use of a control field evaluation unit, an address field conversion unit, and a data field selection unit, the data transmitted in a conventional standard interface can be evaluated such that a simultaneous controlling of at least two logical units via a common interface and a common control command can be realized simply and economically. The address field conversion unit preferably has a masking unit as well as an associated logic unit, by which not only logical units in various operating modes, but also logical units in the same operating mode, can be controlled simultaneously via a common control interface.

Advantageous developments for the inventive control interface unit include having the address field conversion unit comprise a masking unit and a logic unit for converting the transmitted address field into a relevant address. The address field conversion unit may be configured to convert a transmitted address field if the transmitted control field indicates a multiple command and the decoding value indicates a predetermined hierarchical level, and otherwise forwards the transmitted address field in transparent fashion as a relevant address. The control field evaluation unit may evaluate the transmitted control field if the decoding value indicates a predetermined hierarchical level. The frame may be in an HDLC frame format, and the transmitted control field may comprise one bit and be arranged in an address region of an HDLC frame format. The decoding value may be derived from a mode pin of one of the logical units and may comprise an information content of one bit. The logical units may represent time/space coupling units in a coupling network of a telecommunication switching installation.

Advantageous developments for the inventive method include having the step of converting an address field comprise gating the transmitted address field with a mask. The step of converting an address field may comprise converting the transmitted address field only if the transmitted control value indicates a multiple command and the decoding value indicates a predetermined hierarchical level; and forwarding the transmitted address field otherwise. The step of evaluating a control field may be configured to take place only if the decoding value indicates a predetermined hierarchical level. The control field, the address field, and the multiplicity of data fields may be transmitted according to an HDLC transmission protocol. The transmitted control field may have an information content of one bit and be arranged in an address region of an HDLC frame format. Finally, the inventive method may further comprise the step of deriving the decoding value from a mode pin of one of the logical units, the decoding value having an information content of one bit.

BRIEF DESCRIPTION OF THE DRAWINGS

The invention is specified in more detail on the basis of an exemplary embodiment with reference to the drawings.

DESCRIPTION OF THE PREFERRED EMBODIMENTS

Figure 1:
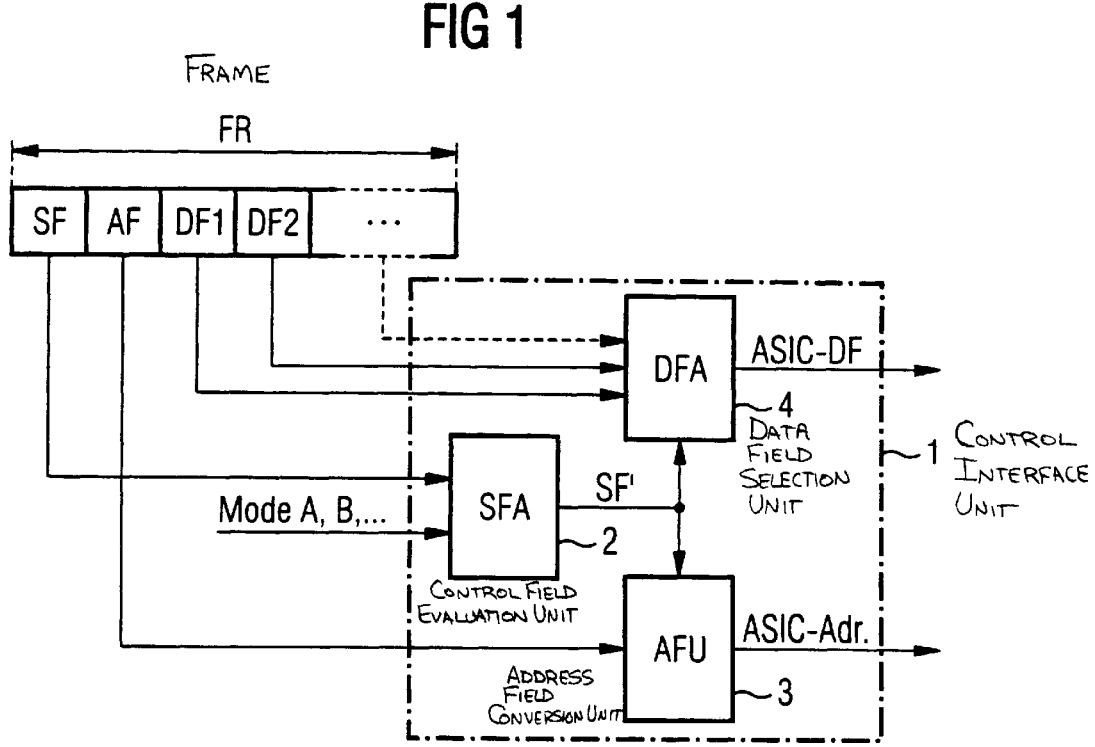
FIG. 1 is a block diagram showing a simplified block diagram of the control interface unit according to the present invention.

FIG. 1 shows a simplified block diagram of an inventive control interface unit 1, that can be implemented, for example, in a multiplicity of logical units for the realization of a simultaneous controlling. The reference character FR designates a simplified frame that can be used by an arbitrary data transmission interface. Such a frame FR is, for example, produced by a control unit (not shown) and is supplied to the control interface unit 1. In order to simplify the illustration, additional data that is typically present for the realization of an asynchronous data transmission, an error check, etc., have been omitted.

It is important for the present invention that each frame FR transmitted to the control interface unit 1 has a control field SF, an address field AF, and at least one data field DF1, DF2, etc. The address field AF essentially contains the information for the addressing of a selected logical unit, while the associated command or the corresponding data are stored in the data fields DF1, DF2, etc. It is also important for the invention to use "multiple commands", having a plurality of data fields DF1, DF2, etc., that can be supplied to a plurality of logical units or to their associated control interface units 1 in a common frame FR, permitting the realization of a "quasi"-simultaneous controlling of a multiplicity of logical units.

According to FIG. 1, a control interface unit 1 has a control field evaluation unit (SFA) 2 for evaluating the control field SF transmitted in the frame FR, in which at least one additional decoding value Mode A, B, etc. is used. The decoding value Mode A, B, etc. is preferably produced by a mode pin that belongs to the control interface unit 1, but it can also be supplied via an additional control interface (not shown). Depending on the evaluation result of the control field evaluation unit 2, a control value SF' is produced that essentially indicates whether the command or data received in the frame FR is a multiple command that is to be executed simultaneously with other control interface units 1 (not shown).

If this is the case, then the data transmitted in the address field AF of the frame FR are converted by an address field conversion unit (AFU) 3, depending on the control value SF', in such a way that a new address ASIC-Adr results that, for example, agrees with the actual address belonging to the control interface unit 1 of the logical unit (e.g., ASIC coupling module). In this way, using an address transmitted in the address field AF, a multiplicity of different control interface units 1, or appertaining logical units, can be controlled, insofar as these units have been preset via the decoding value Mode A, B, etc., and have been selected via the control field SF.

In addition, the control interface unit 1 has a data field selection unit (DFA) 4 for the selection of a predetermined data field from the multiplicity of transmitted data fields DF1, DF2, etc., depending on the control value SF'. More precisely, depending on the control value SF' determined by the control field evaluation unit 2, either the first data field DF1, the second data field DF2, etc., of the frame FR is used and is supplied, as a relevant data field ASIC-DF, to an associated logical unit (e.g., ASIC coupling module). In this way, a significant reduction of commands for the simultaneous controlling of a plurality of logical units is achieved.

For the further clarification of the present invention, the exemplary use of the inventive control interface unit 1 in a multiplicity of coupling modules (e.g., ASIC—application-specific integrated circuit) is described, such as are used for the realization of a coupling network in a telecommunication switching installation.

Figure 2:
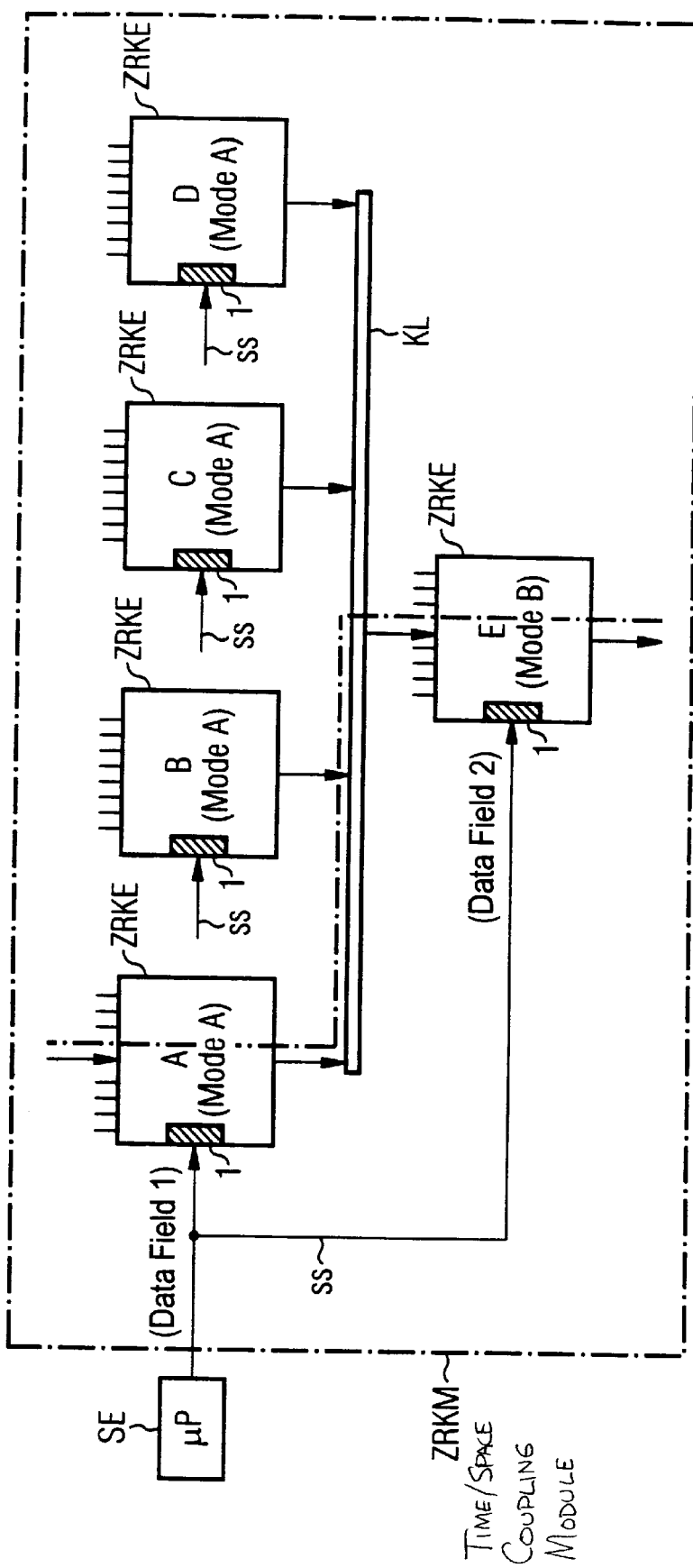
FIG. 2 is a simplified block diagram showing a multiplicity of logical units with the inventive control interface unit for the realization of a coupling network module.

FIG. 2 shows a simplified view of such a coupling module, as is used for example in the type D coupling network of the Siemens switching installation EWSD.

According to FIG. 2, a time/space coupling module ZRKM for the chronological and/or spatial allocation of data channels that are to be switched comprises, for example, five time/space coupling units ZRKE, which preferably have the same construction but can be used in various operating modes. According to FIG. 2, four of these time/space coupling units ZRKE are located in a first hierarchical level for the realization of a chronological and spatial allocation of the data channels that are to be switched, these being operated in a first operating mode Mode A. On the other hand, the fifth time/space coupling unit ZRKE is operated in a second hierarchical level, that is, in an operating mode Mode B, in which a spatial allocation and/or a correction of time slot sequences (TSSI—time slot sequence integrity) can essentially be carried out. The time/space coupling units ZRKE of the first hierarchical level (Mode A) are connected with the time/space coupling unit ZRKE of the second hierarchical level (Mode B) via coupling network lines KL, by way of which a chronological and spatial allocation, with an associated time slot sequence correction (TSSI), can be realized in the time/space coupling module ZRKM for a multiplicity of data channels that are to be switched.

Each of the five time/space coupling units ZRKE, which, as logical units, realize the time/space coupling module ZRKM in the coupling network, has a control interface unit 1 as well as an individual address A, B, C, D, and E, that permit them to be purposively selected or controlled by a control unit SE via a common control interface SS. The control unit SE is preferably controlled by a microprocessor or microcontroller.

When "simple" commands are sent out, by way of the transmission of a predetermined address and an appertaining data field, the control unit SE can thus individually control and purposively switch through each logical unit or time/space coupling unit ZRKE.

However, in coupling networks in particular, it is often necessary that, for example, two time/space coupling units ZRKE be controlled simultaneously in order to realize a switching of data channels. If, for example, a predetermined data channel is chronologically and spatially allocated via the time/space coupling unit ZRKE having the address A, and in addition, a correction of its time slot sequence or an additional spatial allocation is required, this requirement may be realized, for example, in the downstream time/space coupling unit ZRKE having the address E.

As already described above, the time/space coupling unit ZRKE having address A is located in a predetermined operating mode A or inside of the coupling network in a predetermined hierarchical level. In contrast, the time/space coupling unit ZRKE having address E is operated in an operating mode Mode B or an additional hierarchical level, by way of which different functions can be used on one data channel that is respectively to be switched (illustrated by the broken line in FIG. 2).

For the realization of a simultaneous controlling of the various time/space coupling units ZRKE having addresses A and E, a conventional interface can, for example, be used as a common control interface SS, whose data contents can be correspondingly modified.

Figures 3, 4:
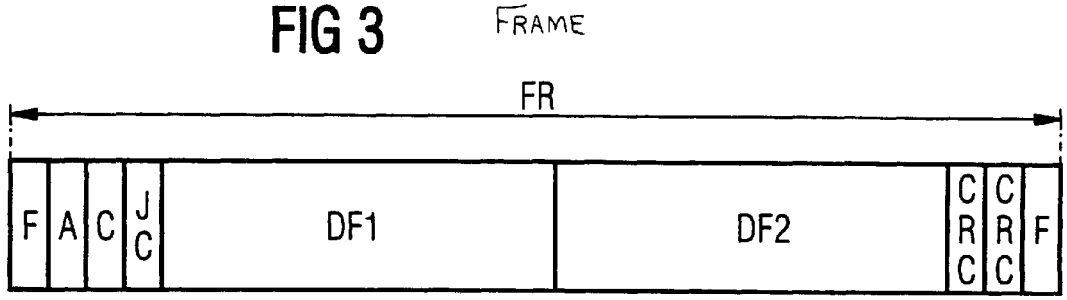
FIG. 3 is a data structure diagram showing a simplified representation of an HDLC frame format as used by the inventive control interface unit.
FIG. 4 is a table illustrating the functioning of the inventive control interface unit.

FIG. 3 shows a simplified representation of an HDLC frame format, as is used, for example, on the common control interface SS. The HDLC data transmission method according to the present exemplary embodiment is described in detail in recommendation X.25 ISO/CCITT, Mar. 2, 1976, in connection with CCITT ISDN I.430, herein incorporated by reference.

According to FIG. 3, for identification purposes, the frame FR has at the beginning and end a flag F having for example a bit pattern "01111110." In addition, the frame FR has an address region A in which both the above-described address field AF and also the previously described control field SF are contained. The control field SF is made up of one bit (e.g., bit 7), where a value "0" for bit 7 indicates a simple command, and a value "1" for bit 7 indicates a double command. The control field SF can however also have a plurality of bits in which multiple commands can also be indicated or realized. In addition, such bits can also be built into all additional fields of the HDLC frame FR.

The reference character C designates a control field of the HDLC frame FR, which has no further significance for the present invention other than the fact that the above-described control field SF can also be located or transmitted in this control field C. In addition, the frame FR has the fields (which are without significance for the present invention) JC (job code) and CRC, for the monitoring of block errors (e.g., according to a rule $P=x^{16}+x^{12}+x^5+1$).

However, for the present invention it is important that in the transmission of a double or multiple command, a data frame FR contain both a data field DF1 and a data field DF2.

For the discussion below, according to FIG. 2, the time/space coupling unit ZRKE having the address A is controlled simultaneously with the time/space coupling unit ZRKE having the address E, where the time/space coupling unit having the address A receives a data field DF1, and the time/space coupling unit having the address E receives a data field DF2.

For the illustration of the manner of operation of the address field conversion unit 3, the following assumes that an address field AF transmitted in the address region A has six bits, with the address A representing the value "001100" and the address E representing the value "001000." In principle, a logical unit or the time/space coupling unit ZRKE executes a command only if the separate address ASIC-Adr agrees with the address transmitted in the address field AF of the address region A. For the realization of a simultaneous controlling, the control unit SE therefore writes the address A="001100" in the address region A, via which the time/space coupling unit ZRKE having address A can be immediately controlled. The decoding value (Mode A) is then evaluated, which for example determines that, for a correct addressing, i.e., agreement of the transmitted address with the separate address, the data field DF1 is applied and processed.

In addition, the time/space coupling unit ZRKE having the address E also receives the same command with an address that does not agree. Since, however, the decoding value indicates the operating mode Mode B, the address field conversion unit 3 in the control interface unit 1 is controlled in such a way that, in addition, the control field SF or bit 7 in the address region A of the HDLC frame FR is taken into account. In the transmission of a double or multiple command, this bit 7 is, for example, set to the value "1," by which it is additionally indicated to the address field conversion unit 3 that a predetermined address field conversion is to be carried out for the time/space coupling unit ZRKE having the address E.

This conversion of the address transmitted by the serial control interface SS preferably takes place via a masking unit (not shown) and an associated logic unit, which can, for example, be realized by an AND gate having a masking register. A transmitted address in the address field AF of "001100" and a masking register having the value "011000", results in a masked address field AF having the value "001000". This masked address is then further processed as the relevant address ASIC-Adr, and is, for example, compared with the actual address E of the logical unit. Since an agreement of the addresses results from the masking, the time/space coupling unit having the address E then regards itself as having been addressed, and is ready for the processing of an item of information transmitted in a data field.

However, in the same manner as the address field conversion unit 3, the data field selection units 4 is also controlled dependent on the decoding value Mode B and on the value of the control field SF, in such a way that the data field DF2, rather than the data field DF1, of the frame FR is then further processed.

For all additional time/space coupling units having the non-selected addresses B, C and D, an evaluation similar to that in the time/space coupling unit having the address E results; however, due to the differently set decoding value Mode A, none of these logical units is selected or controlled.

FIG. 4 shows a summarizing tabular representation of the various possibilities for the illustration of the above-described selection possibilities by the control interface unit 1.

This provides a significant reduction of commands for the setting of a respective connection in a coupling network. In addition, the simultaneous setting of the connection in various logical units improves the efficiency of the coupling network, since more commands can be executed per time unit. Also, in this way a plurality of logical units can be controlled as a group, resulting in improved test possibilities in the coupling network. Finally, due to the use of only one common serial control interface SS, the development expense and manufacturing costs of a respective time/space coupling module ZRKM can be further reduced.

The invention has been described above in exemplary fashion on the basis of time/space coupling units in a coupling network of a telecommunication switching installation. However, the invention is not limited to this, and rather comprises all further possibilities of application in which a multiplicity of logical units must be controlled simultaneously via a common control interface.

Additionally, the control interface has been specified with the use of an HDLC transmission protocol. However, the invention is not limited to this, and rather comprises all additional control interfaces with the various transmission protocols in which a flexible implementation of a control field, of an address field, and of data fields is possible.

In addition, the decoding value for the logical units is preferably produced by a mode pin. However, this value can be produced in the same way by another interface, or in some other manner. The above-described method and control interface unit are illustrative of the principles of the present invention. Numerous modifications and adaptations thereof will be readily apparent to those skilled in this art without departing from the spirit and scope of the present invention.

What is claimed is:

1. A control interface unit for simultaneously controlling at least two logical units, comprising:

a control field evaluation unit for evaluating a control field transmitted in a frame, dependent on a decoding value, and for producing a control value;

an address field conversion unit for converting a transmitted address field dependent on said produced control value; and a data field selection unit for selecting a data field from a multiplicity of transmitted data fields dependent on said produced control value.

2. The control interface unit according to claim 1, wherein said address field conversion unit comprises a masking unit and a logic unit for converting said transmitted address field into a relevant address.

3. The control interface unit according to claim 1, wherein said address field conversion unit converts a transmitted address field if said transmitted control field indicates a multiple command and said decoding value indicates a predetermined hierarchical level, and otherwise forwards said transmitted address field in transparent fashion as a relevant address.

4. The control interface unit according to claim 1, wherein said control field evaluation unit evaluates said transmitted control field if said decoding value indicates a predetermined hierarchical level.

5. The control interface unit according to claim 1, wherein said frame represents an HDLC frame format.

6. The control interface unit according to claim 1, wherein said transmitted control field comprises one bit and is arranged in an address region of an HDLC frame format.

7. The control interface unit according to claim 1, wherein said decoding value is derived from a mode pin of one of said logical units and has an information content of one bit.

8. The control interface unit according to claim 1, wherein said logical units represent time/space coupling units in a coupling network of a telecommunication switching installation.

9. A method for simultaneously controlling at least two logical units, comprising the steps of:

evaluating a control field transmitted in a frame, if a decoding value so indicates, for the production of a control value;

converting an address field transmitted in said frame, if said control value so indicates; and selecting a data field from a multiplicity of data fields transmitted in said frame, depending on said control value.

10. The method according to claim 9, wherein said step of converting an address field comprises gating said transmitted address field with a mask.

11. The method according to claim 9, wherein said step of converting an address field comprises:

converting said transmitted address field only if said transmitted control value indicates a multiple command and said decoding value indicates a predetermined hierarchical level; and forwarding said transmitted address field otherwise.

12. The method according to claim 9, wherein said step of evaluating a control field takes place only if said decoding value indicates a predetermined hierarchical level.

13. The method according to claim 9, wherein said control field, said address field, and said multiplicity of data fields are transmitted according to an HDLC transmission protocol.

14. The method according to claim 9, wherein said transmitted control field has an information content of one bit and is arranged in an address region of an HDLC frame format.

15. The method according to claim 9, further comprising the step of deriving said decoding value from a mode pin of one of said logical units, said decoding value having an information content of one bit.

* * * * *